(12) United States Patent
Pace (10) Patent No.: US 9,294,480 B2
(45) Date of Patent: Mar. 22, 2016

(54) TRACKING AND TRACING INFORMATION THEFT FROM INFORMATION SYSTEMS

(71) Applicant: Cisco Technology, Inc., San Jose, CA (US)

(72) Inventor: Nicholas R. Pace, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 24 days.

(21) Appl. No.: 14/155,615

(22) Filed: Jan. 15, 2014

(65) Prior Publication Data

US 2015/0200940 A1 Jul. 16, 2015

(51) Int. Cl.
*H04L 29/06* (2006.01)
*G06F 21/16* (2013.01)

(52) U.S. Cl.
CPC .............. *H04L 63/10* (2013.01); *G06F 21/16* (2013.01); *G06F 2221/2127* (2013.01)

(58) Field of Classification Search
CPC ..... H04L 63/08; H04L 63/10; H04L 63/0428; H04W 12/06; H04W 12/08
See application file for complete search history.

(56) References Cited

U.S. PATENT DOCUMENTS

| | | | | |
|---|---|---|---|---|
| 5,509,074 | A * | 4/1996 | Choudhury | G06F 21/10 705/51 |
| 5,953,415 | A * | 9/1999 | Nielsen | G06F 21/10 705/51 |
| 6,266,664 | B1 * | 7/2001 | Russell-Falla | G06F 17/30867 707/700 |
| 7,010,144 | B1 * | 3/2006 | Davis | G06T 1/0021 382/100 |
| 7,401,146 | B1 | 7/2008 | Menditto et al. | |
| 7,676,568 | B2 | 3/2010 | Day | |
| 8,041,074 | B2 * | 10/2011 | Rhoads | G06F 17/30026 382/100 |
| 8,204,977 | B1 * | 6/2012 | Brodersen | H04L 12/6418 709/223 |
| 8,233,388 | B2 * | 7/2012 | Zheng | H04L 12/66 370/229 |
| 8,601,034 | B2 | 12/2013 | Roesch | |
| 2002/0001395 | A1 * | 1/2002 | Davis | G06F 21/10 382/100 |
| 2002/0091665 | A1 * | 7/2002 | Beek | G06F 17/30817 |
| 2003/0133592 | A1 | 7/2003 | Rhoads | |
| 2008/0037838 | A1 * | 2/2008 | Ianculescu | G06K 9/00228 382/118 |
| 2008/0072290 | A1 * | 3/2008 | Metzer | G06F 17/30348 726/3 |

(Continued)

FOREIGN PATENT DOCUMENTS

| | | |
|---|---|---|
| EP | 0 665 486 A2 | 8/1995 |
| EP | 0 798 619 A2 | 10/1997 |
| WO | WO 01/52178 A1 | 7/2001 |

OTHER PUBLICATIONS

Helmer, Guy G. et al., "Intelligent Agents for Intrusion Detection", Iowa State University, Ames Iowa 50011, 4 pages.*

(Continued)

*Primary Examiner* — Yonas Bayou
(74) *Attorney, Agent, or Firm* — Parker Ibrahim & Berg LLC; James M. Behmke; Stephen D. LeBarron (57) ABSTRACT

In one embodiment, a processing device receives, from an accessing system, an access request for stored information. In response, the device generates unique classification and tracking metadata based on the access request, and embeds the classification and tracking metadata as steganographic code into the source information before returning the information according to the request. The device then replies to the access request with the return information containing the embedded steganographic code.

24 Claims, 10 Drawing Sheets

(56) References Cited

U.S. PATENT DOCUMENTS

2011/0138442 A1* 6/2011 Vinberg .................. G06F 21/53 726/1
2013/0262461 A1 10/2013 Pignataro et al.
2014/0298477 A1* 10/2014 Castro .................. G06F 21/606 726/26

OTHER PUBLICATIONS

Ning, Peng et al., "Abstraction-Based Intrusion Detection in Distributed Environments," 2001, ACM Transactions on Information and System Security (TISSEC), vol. 4, Issue 4, pp. 407-452.*

Longofest, "For Debate: Is Apple Using Steganography in iTunes Plus Songs? [Updated: No?]", MacRumors.com, Jun. 2007, 1 page, World Wide Web article.
Olzak, T., "Protect Your Organization From Steganographic Data Theft", TechRepublic, Jan. 2007, 6 pages, World Wide Web blog article.
Sadun, E., "Is that Steganography? More Adventures in iTunes Plus Tagging", O'Reilly Mac DevCenter.com, Jun. 2007, 10 pages, World Wide Web article.
Wikipedia, "Steganalysis", Wikimedia Foundation, Inc., Oct. 2013, 4 pages, World Wide Web.
International Search Report dated Mar. 26, 2015 issued in connection with PCT/US2015/010780.

* cited by examiner

TRACKING AND TRACING INFORMATION THEFT FROM INFORMATION SYSTEMS

TECHNICAL FIELD

The present disclosure relates generally to computer systems, and, more particularly, to tracking and tracing information theft from computer systems.

BACKGROUND

Information theft is a growing concern within computer system environments, particularly intellectual property theft from corporate environments. Securing enterprise information systems is an immensely difficult challenge, and organizations are faced with accepting that some degree of intellectual property theft will occur regardless of the level of security controls in place.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a processing device receives, from an accessing system, an access request for stored information. In response, the device generates unique classification and tracking metadata based on the access request, and embeds the classification and tracking metadata as steganographic code into the information before returning the information according to the request. The device then replies to the access request with the return information containing the embedded steganographic code.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Notably, in addition to networking a collection of computing devices (e.g., user devices, servers, etc.) through network management devices (e.g., routers, switches, etc.), various specific computer network implementations also exist beyond the typical configuration. For instance, "cloud computing" can be generally defined as Internet-based computing in which computing resources are dynamically provisioned and allocated to client or user computers or other devices on-demand from a collection of resources available via the network (e.g., "the cloud"), such as for example, processing, storage, applications, etc. Additionally, smart object networks, such as sensor networks, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Accordingly, the examples given herein referring to a "computer network" are not limited to merely user computers and information servers, but also any suitable computer network/system configuration.

Figure 1:
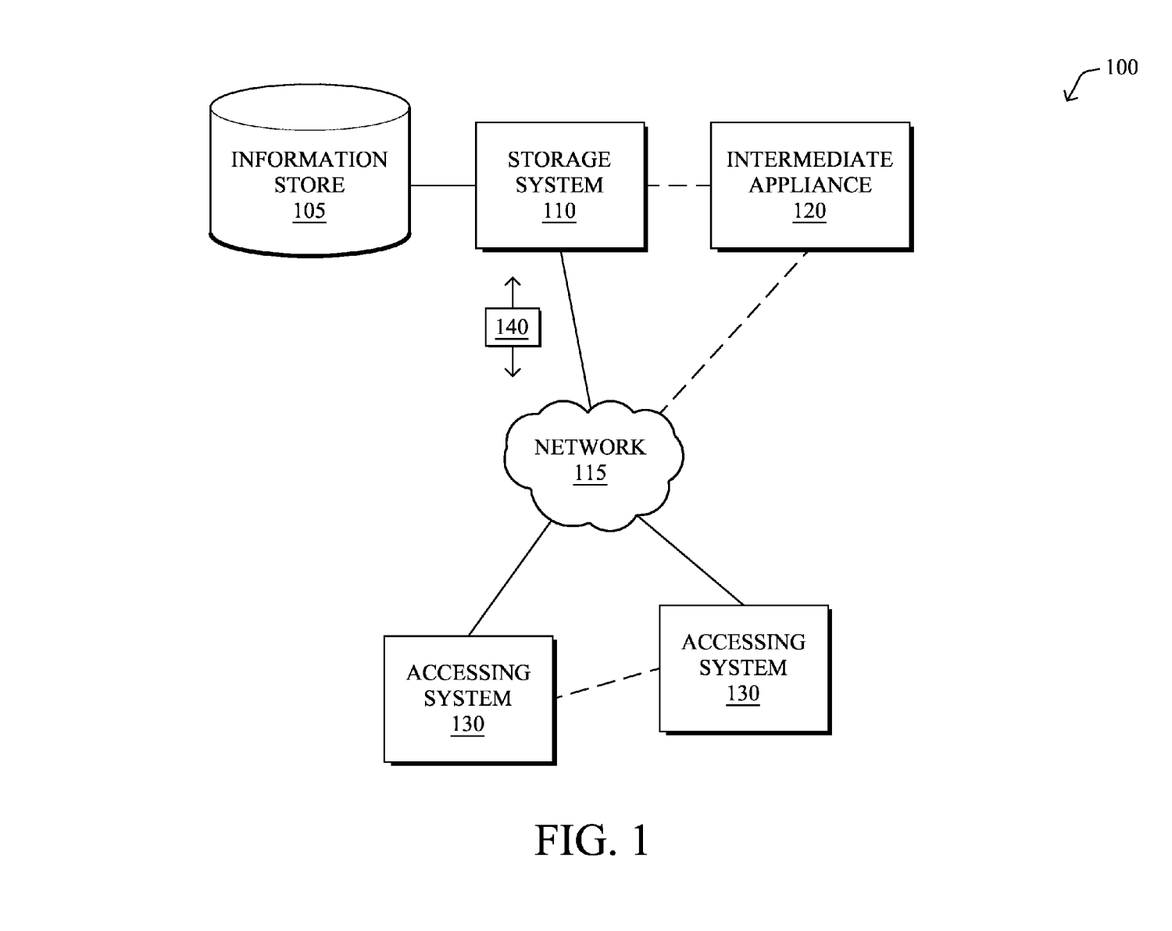
FIG. 1 illustrates an example computer network.

FIG. 1 is a schematic block diagram of an example simplified computer network 100 illustratively comprising an information store/database 105, which may be managed by (and accessed via) a storage system 110. As described below, the storage system may be directly or indirectly connected to a network 115, such as via an intermediate appliance 120 (e.g., a router, firewall, security appliance, access appliance, etc.). Also interconnected to the network 115 may be one or more accessing systems 130 (e.g., user devices, routers or proxy devices acting on behalf of users/devices, etc.). Data packets 140 (e.g., traffic and/or messages sent between the devices) may be exchanged among the nodes/devices of the computer network 100 using predefined network communication protocols such as certain known wired protocols, as well as wireless protocols or other shared-media protocols where appropriate.

Those skilled in the art will understand that any number of nodes, devices, links, etc. may be used in the computer network, and they may be connected in a variety of different manners, and that the view shown herein is for simplicity. Those skilled in the art will also understand that while the embodiments described herein are described generally, it may apply to any network configuration within a given domain (e.g., an Autonomous System (AS) or area), or throughout multiple domains.

As noted above, information theft is a growing concern within computer system environments, particularly intellectual property theft from corporate environments. Securing enterprise information systems is an immensely difficult challenge, and organizations are faced with accepting that some degree of intellectual property theft will occur regardless of the level of security controls in place.

To increase the disincentives of information theft, a solution is required to track data beyond the systems that govern it. Furthermore, in cases where information theft is suspected, particularly for intellectual property theft, tracing the origin of the stolen information is critical in building a strong legal case against those who are suspected of stealing or trading it. Both aspects are essential to deterring information theft and claiming damages from it.

Most of today's enterprise information systems do not directly address the concerns above. Those that do, however, rely on a system of trust using digital rights management technologies that require every computing system involved to participate in the trust mechanism. Such trust mechanisms not only limit interoperability between computing systems, but also have intrinsic weaknesses with several documented cases of exploit.

The techniques herein, therefore, provide a method and system by which information can be tracked and traced beyond the computer systems from which they originate, particularly when parties of suspected intellectual property theft are involved, in a passive and undetectable manner, while preserving computer system interoperability. In particular, through use of steganography, content can be tracked passively after information has escaped a trusted environment. By combining this with other content alteration techniques based on the nature of threat (e.g., use of inauthentic content substitution, and active tracking), damage from such a breach can be mitigated. Note that by using the techniques described herein, law enforcement and legal proceedings may have sufficient evidence of the origin and degree of exposure to prosecute accordingly.

Specifically, according to one or more embodiments of the disclosure as described in detail below, a processing device receives, from an accessing system, an access request for stored information. In response, the device generates unique classification and tracking metadata based on the access request, and embeds the classification and tracking metadata as steganographic code into the information before returning the information according to the request. The device then replies to the access request with the return information containing the embedded steganographic code. Various specific features and embodiments are further described below as well.

Illustratively, the techniques described herein may be performed by hardware, software, and/or firmware, such as in accordance with one or more associated processes, which may contain computer executable instructions executed by a processor to perform functions relating to the techniques described herein.

Figure 2:
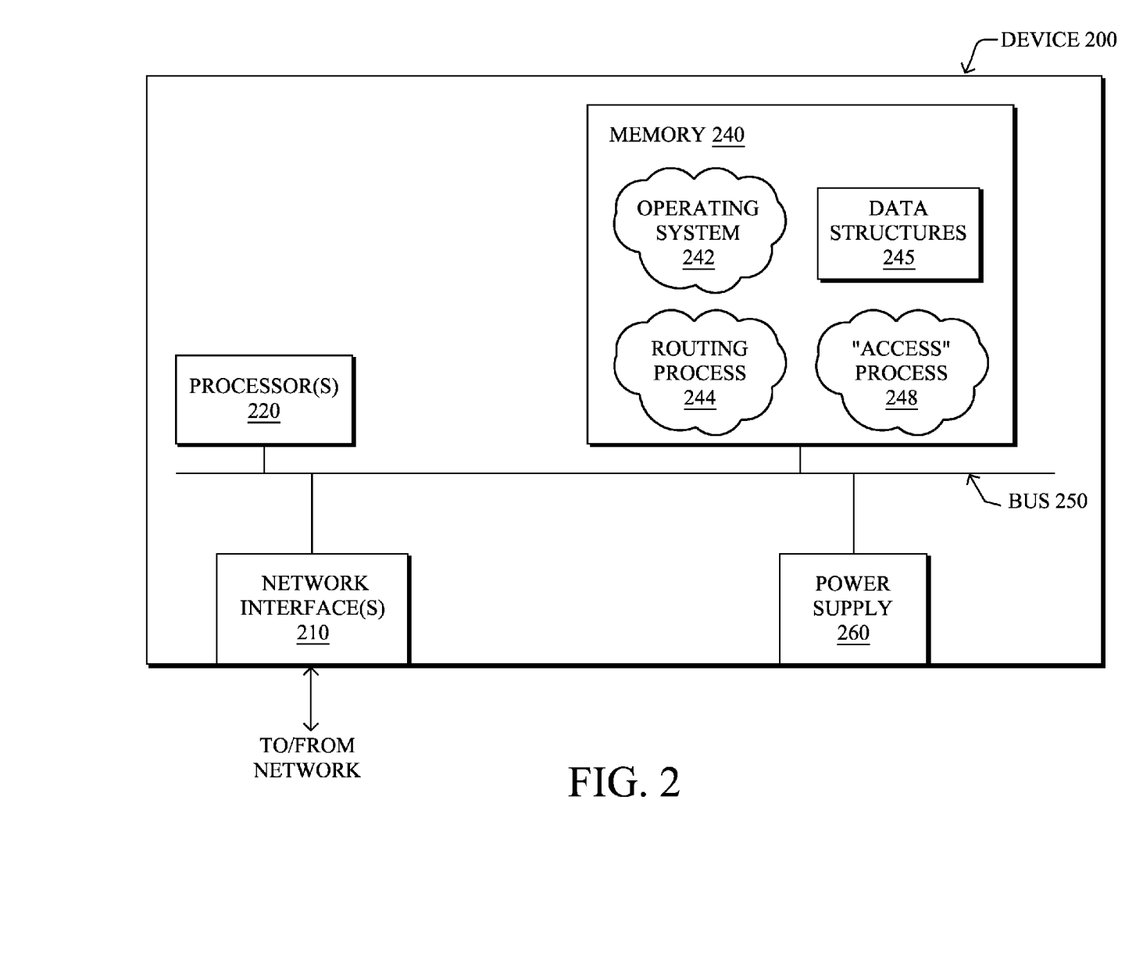
FIG. 2 illustrates an example network device.

FIG. 2 is a schematic block diagram of a simplified example node/device 200 that may be used with one or more embodiments described herein, e.g., as any of the devices shown in FIG. 1 above that participates in the techniques described herein. The device may comprise one or more network interfaces 210 (e.g., wired, wireless, etc.), at least one processor 220, and a memory 240 interconnected by a system bus 250.

The network interface(s) 210 contain the mechanical, electrical, and signaling circuitry for communicating data over links coupled to the network 100. The network interfaces may be configured to transmit and/or receive data using a variety of different communication protocols.

The memory 240 comprises a plurality of storage locations that are addressable by the processor 220 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise an illustrative (and generic) "access process" 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Moreover, while processes may be shown and/or described separately, those skilled in the art will appreciate that processes may be routines or modules within other processes. Further, while certain processes and/or data structures are shown within central memory 240, alternative embodiments may place certain processes and/or data structures within individual network interfaces 210 or other dedicated locations, as may be appreciated by those skilled in the art.

As noted above, the techniques herein are directed generally to the application of steganography to embed traceable and verifiable information that uniquely identifies the accessing user, date, time, location, and information system by which they accessed the information, in such a way that through ordinary means is undetectable, but can be retrieved and authenticated for use in legal prosecutions.

Illustratively, the techniques described herein may be performed by hardware, software, and/or firmware, such as in accordance with the illustrative access process 248, which may contain computer executable instructions executed by the processor 220 (e.g., particularly of a storage system 110, intermediate appliance 120, or in certain embodiments, of accessing system 130) to perform functions relating to the techniques described herein. For example, the techniques herein may be treated as extensions to conventional file transfer/access/execution protocols, and as such, may be processed by similar components understood in the art that execute those protocols.

Figure 3:
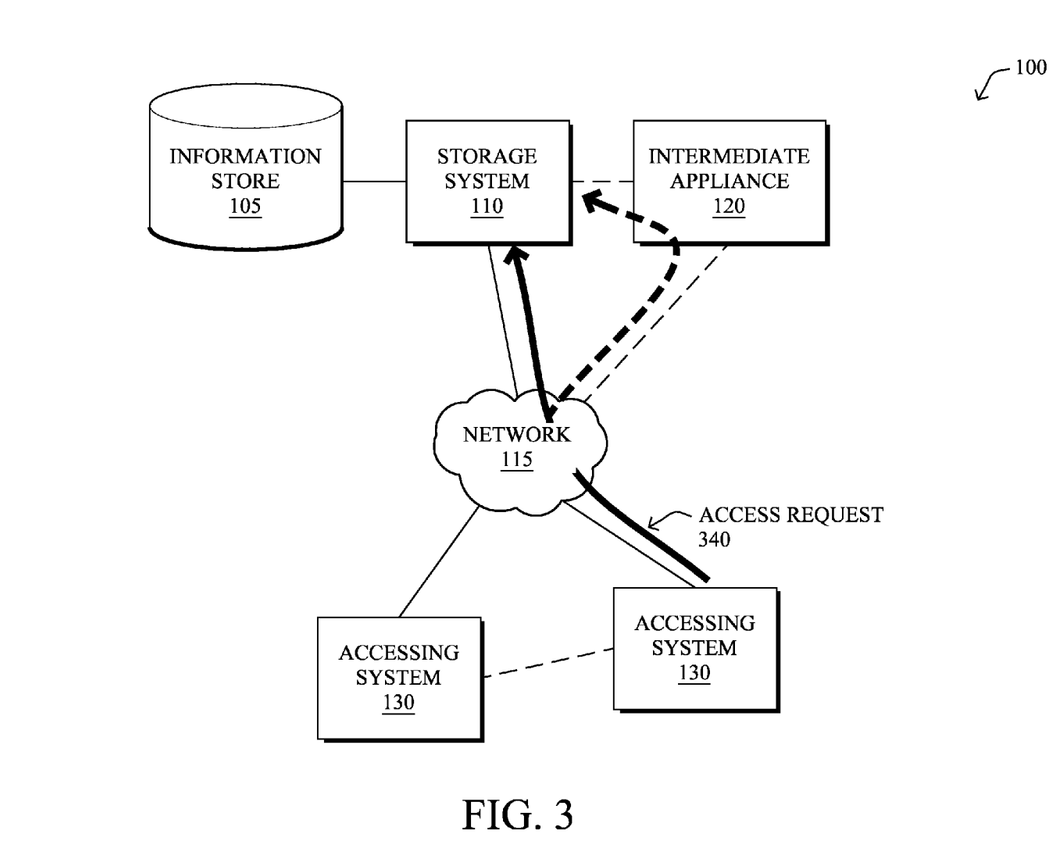
FIG. 3 illustrates an example access request.

Operationally, as shown in FIG. 3, when an accessing system 130 sends an access request 340 for stored information (e.g., multimedia files, binary executables, documents, videos, text, images, audio files, software source code, firmware source code and so on), it is received either directly by an information storage system 110, or else by an intermediate network appliance 120 between the accessing system and the storing device, depending upon the particular network configuration in use. For instance, the intermediate appliance 120 may act as a gateway to a protected information system and/or as a proxy to apply the described methodology herein.

In response to receiving the request, the appropriate device is configured to generate unique classification and tracking metadata based on the access request, and to embed the classification and tracking metadata as steganographic code into the source information before returning the information according to the request, as described herein. In particular, the techniques herein tag arbitrary information assets with hidden data classification and tracking attributes in a manner that is compatible with all existing information systems that handle the information assets.

Notably, the implementation of the techniques herein may be applied to the content under protection continuously, on-demand, or through automated measures. For instance, in one embodiment or configuration, continuous application of the methodology may be used as a proactive measure to track access to content. In another embodiment or configuration, embedding of the steganographic code may be dynamically triggered in response to one of either a suspected information theft or a particular user access. That is, the application of the methodology can be scoped to a specific user, group of users, globally, or otherwise, upon access to the protected information system, or else a particular suspected information theft may be determined manually or in response to automated event detection. For example, on-demand application of the methodology may be enabled manually in response to specific conditions or threats perceived by human decision makers, or else an automated implementation may use complex event processing (e.g., comparable to that used in fraud detection of real-time electronic financial transactions) to detect and apply the methodology in response to perceived threats based on a set of rules that correlate disparate enterprise events over time (e.g., downloading thousands of files at once).

Figure 4:
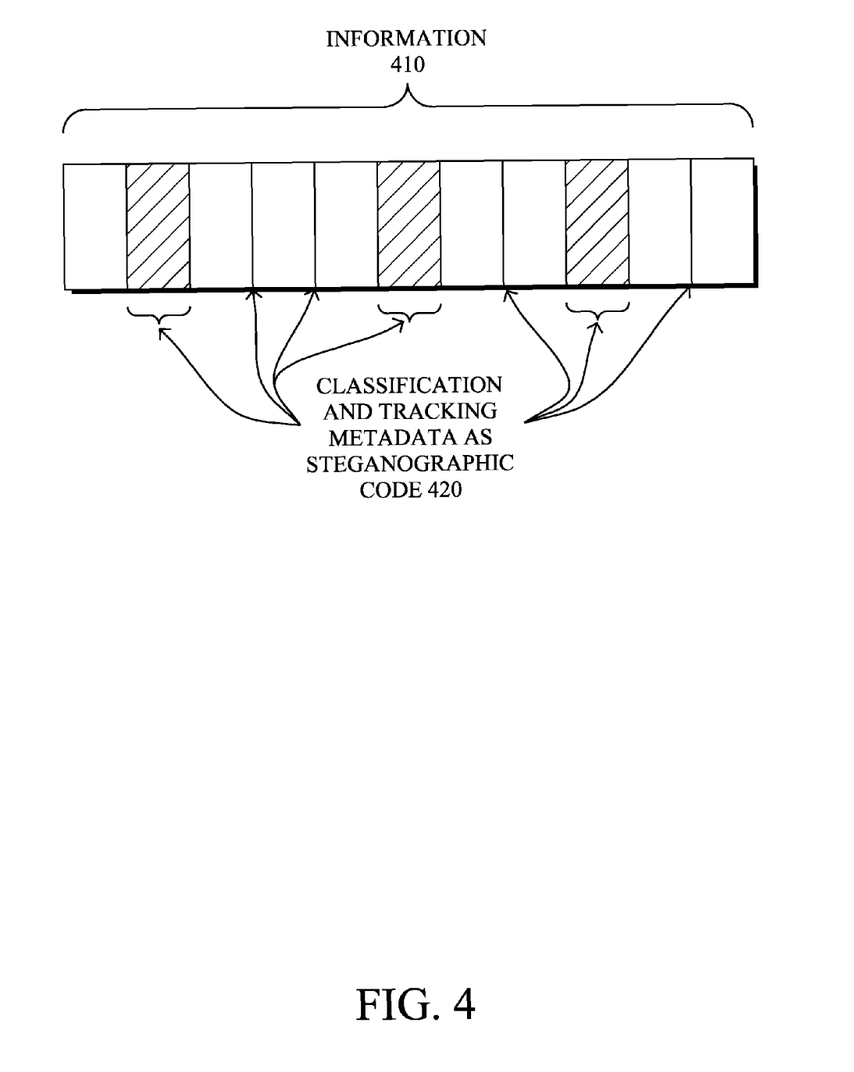
FIG. 4 illustrates an example of embedded steganographic code.

With reference to FIG. 4, the classification and tracking metadata may be embedded as steganographic code 420 directly into the return information 410 itself. That is, the classification and tracking metadata 420 is embedded in a manner such that it goes undetected, i.e., is steganographic. In one embodiment, the steganographic code may be embedded with a variable degree of redundancy within the return information to provide resiliency in the event the return information is subdivided and distributed or otherwise processed via a medium that incurs data-loss. Such examples include, but are not limited to: printing, scanning, fax, photography, image manipulation, and audio/visual compression.

The steganography may be performed in response to each specific access attempt (e.g., in real-time or near real-time). In particular, the steganographic code 420—contains information to identify one or more features of the access request, such as identifying information on the accessing system, an accessing user, an access date, an access time, and an accessing system location, along with any other relevant information. In this manner, the techniques herein provide specific "trackability", that is, where is the information, who accessed it, etc., since each access request (and associate accessing system 130) would create its own fingerprint per each specific request, in one particular embodiment. That is, the amount of steganographic code 420, and degree of detectability, may be adjusted according to the available space for encoding steganographic information within the content and remain below a detectable threshold. For example, in one embodiment, adjusting a size of the embedded steganographic code based on the return information may be based on selecting a particular subset of features of the access request from which the unique steganographic code is generated (e.g., only identifying the accessing system, and not the time/date/etc.).

Figure 5A:
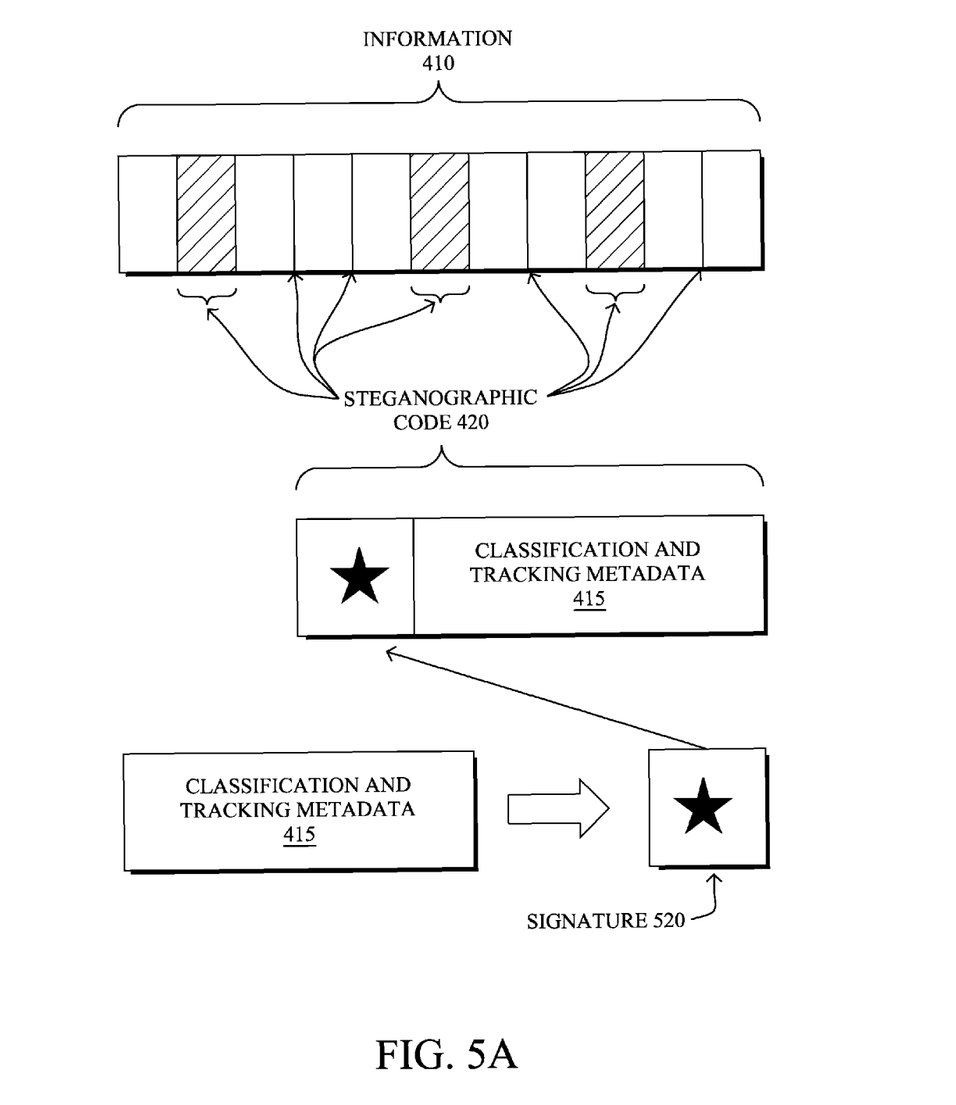
FIGS. 5A-5B illustrate examples of cryptographic signatures.
Figure 5B:
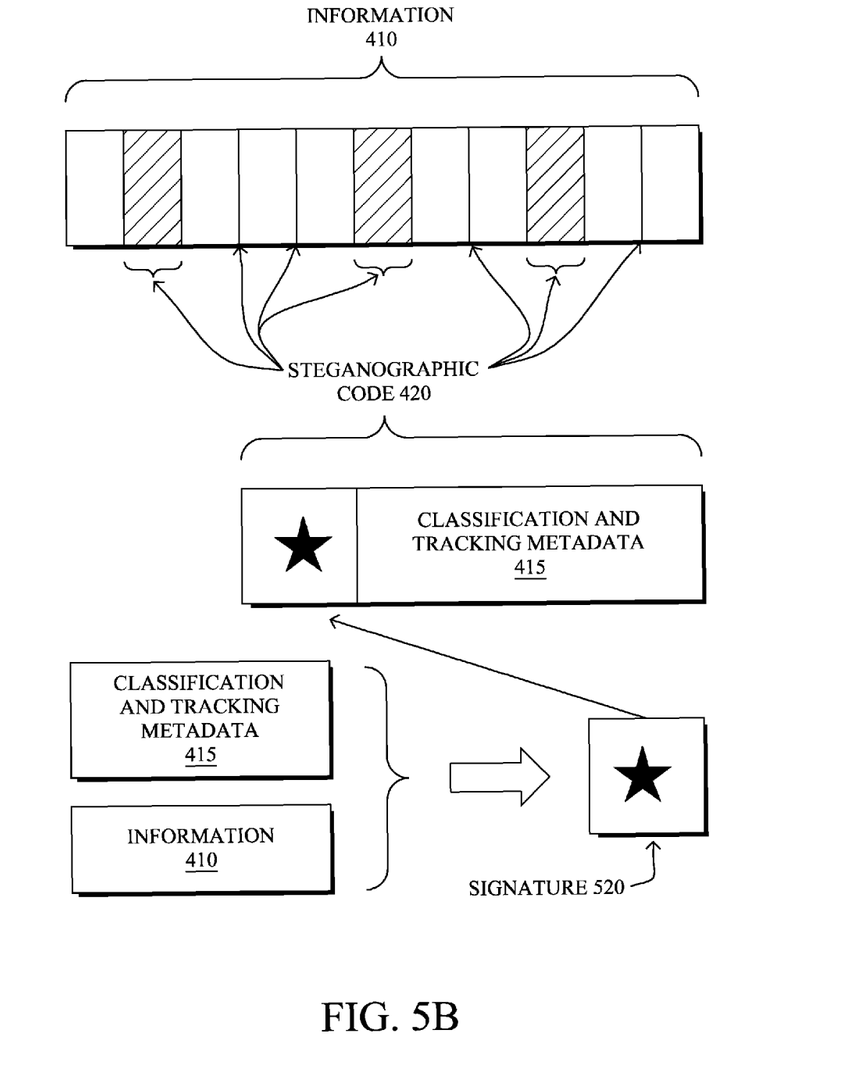

According to one or more embodiments of the techniques herein, the steganographic code may be signed with a verifiable cryptographic signature to prove authenticity. For instance, the added cryptographic signature is illustratively one that cannot be altered, and that cannot be taken from one file/documents and placed into another. Note that as shown in FIGS. 5A-5B, the cryptographic signature 520 may be computed to authenticate only the classification and tracking metadata and embedded as steganographic code 420, or in addition may be computed to include the source content information 410, to further prove that the code was embedded within that specific content.

Figure 6:
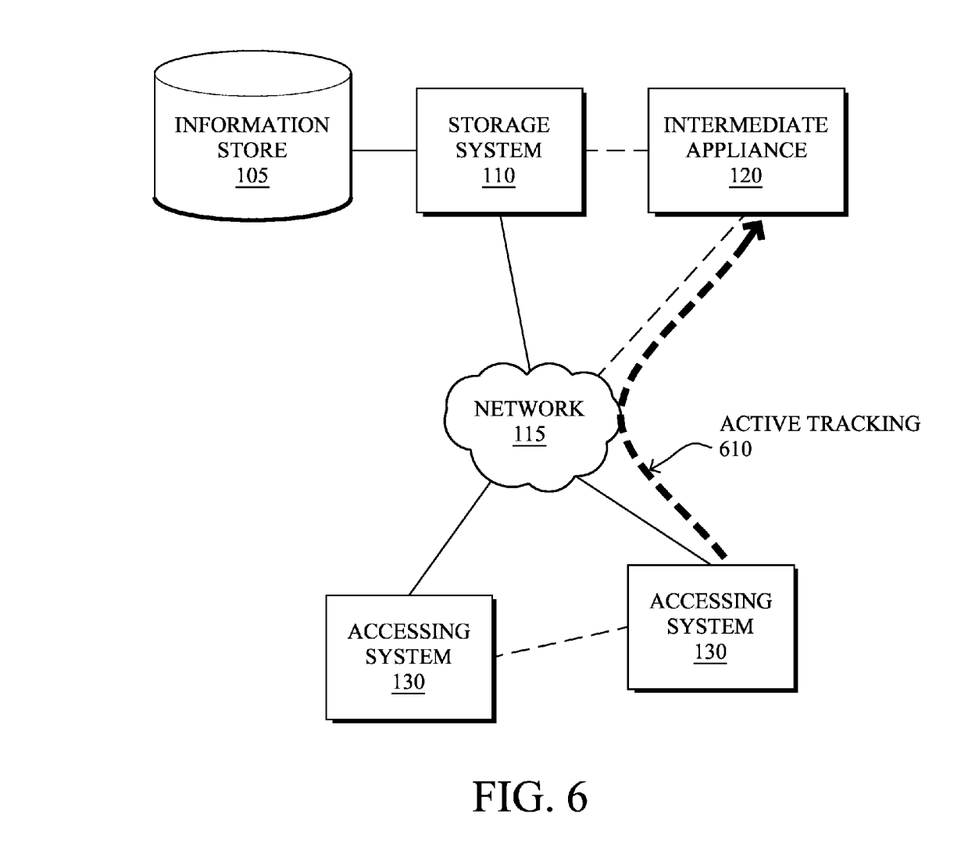
FIG. 6 illustrates an example of active tracking.

Furthermore, in one or more embodiments of the techniques herein, injection of executable computer instructions may be contained within the steganographic code, such as into multimedia documents and binary executables, as well as injection of obfuscated source code into software and firmware source code, so that when viewed, compiled, or executed, the computer systems that are in possession of the content transmit information to a tracking system (e.g., the same system that embedded the code or another system). For instance, as illustrated in FIG. 6, in addition to merely passive code (e.g., to identify the accessing system), the embedded steganographic code may be configured to enable active tracking 610 of the return information, such as information essential to successful legal prosecution and recovery of stolen intellectual property. Note that active tracking of protected content may illustratively be achieved by injecting software-based tracking mechanisms into execution or compile paths, which may comprise macros, obfuscated source code/source code fragments, scripts, binary executables/executable computer instructions, etc.

Figure 7:
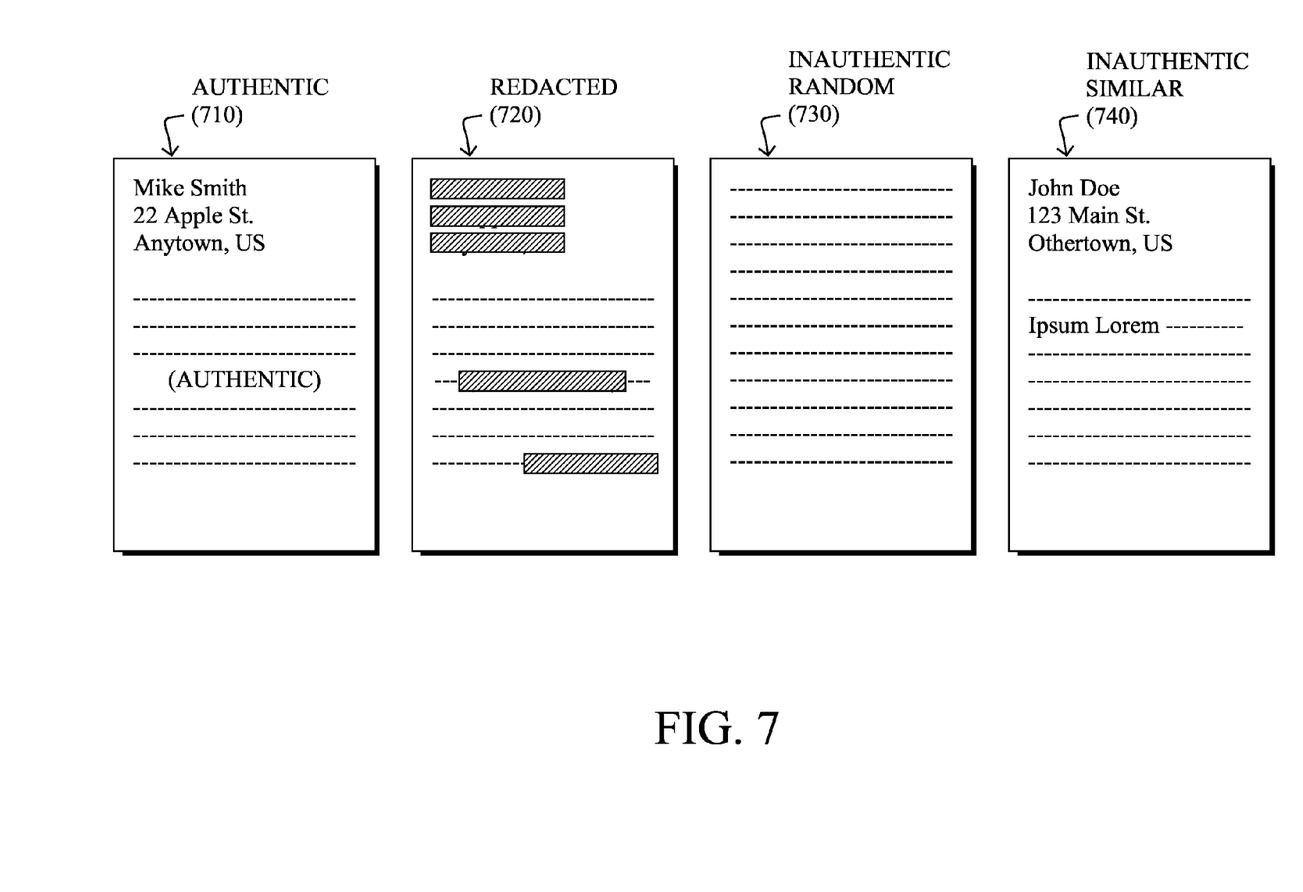
FIG. 7 illustrates examples of authentic and inauthentic information.

Note that in one or more embodiments herein, the techniques may be applied to both authentic and inauthentic content. For example, suspicion of intellectual property theft, through manual or automated means, may result in generation of genuine-appearing but inauthentic content from information systems accessed by the suspect, so that further unauthorized dissemination of accessed content results in little or no damage to the intellectual property holder. Said differently, damage from intellectual property theft may be mitigated by replacing authentic content with inauthentic content upon detection of a threat condition. According to these illustrative embodiments, the resulting content/returned information 410 may be either authentic or inauthentic depending on the static and runtime configuration of the implementation.

For example, as illustrated in FIG. 7, as one option, the return information may be authentic stored information 710 (i.e., unedited content), while in another option, the authentic stored information may be redacted (720). Further, inauthentic information may be random (730), or may be "similar" (740). For instance, inauthentic content may be generally defined as generated text, images, source code, or otherwise that mimic the authentic content that is under protection. In one option, the generated inauthentic content can be completely random (730), while in another option (740), the authentic content is analyzed at runtime for structure, size, composition, keywords, language, image similarity, paragraph length, etc., for use as parameters in generation of the inauthentic content so that it appears highly similar to the original content. Also, with regard to the redacted information, authentic content may have automated redaction applied based on rules defined for keywords, images, or complex sentence structure parsing (e.g., redact names/addresses/keywords, changing just addresses, etc.).

Illustratively, in one embodiment, the degree of authentic, redacted, or inauthentic content may be decided according to the level of threat at runtime by evaluating rules based on static and dynamic information. Said differently, the return information 410 may be selected from the group of options above based on a level of threat to the stored information, and selecting to use the return information may be generally dynamically triggered in response to a suspected information theft.

The replying system/device may reply to the access request with the return information 410 containing the embedded steganographic code 420 according to the techniques described above, thus enabling classification, protection, and tracking of content after it leaves the information system of origin (i.e., where the steganographic information may be later extracted to trace the origin of the content, or else by activating the active tracking). Note that upon reinsertion of protected content to a protected information system (e.g., one authorized to receive the information 410), the behavior of the underlying information system is preserved by removing the steganographic information 420 from the content, and the origin of the reinserted content may be logged and captured.

Figure 8:
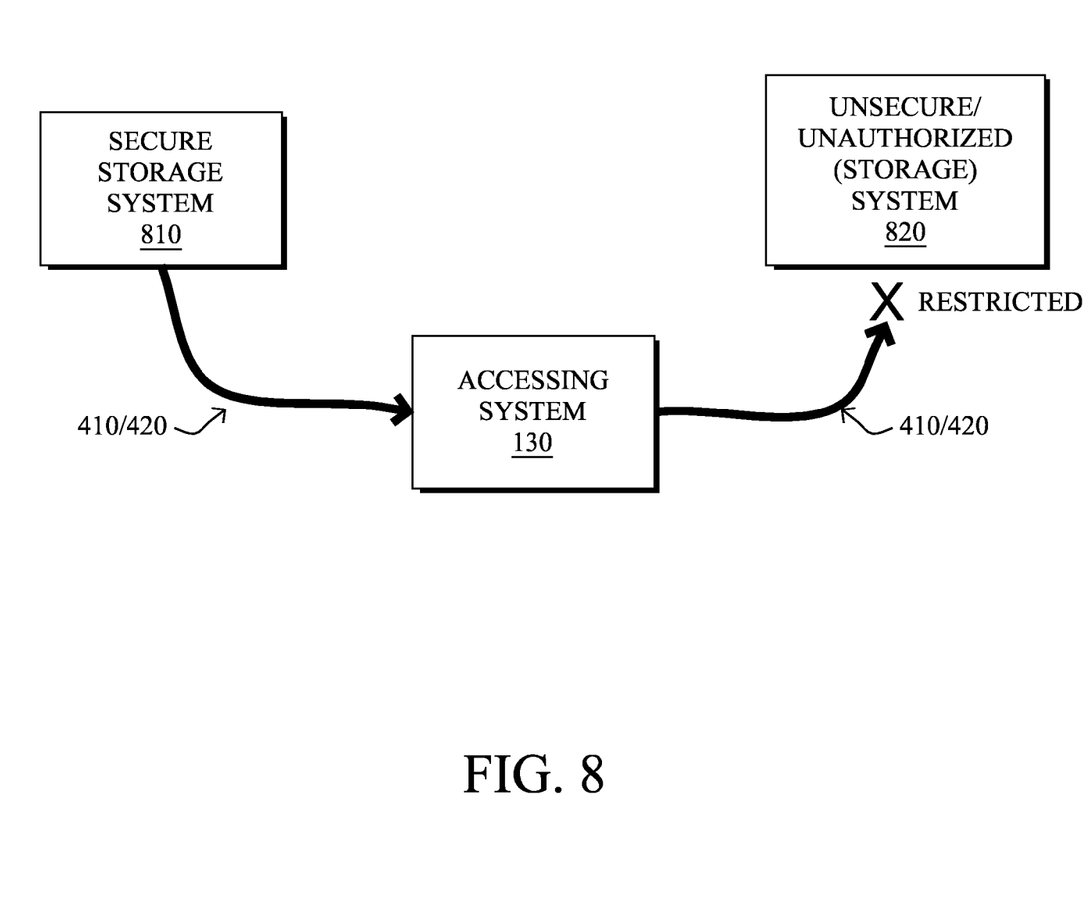
FIG. 8 illustrates an example of secure information transfer.

In one additional embodiment, the techniques herein also provide a system that prevents unauthorized or unintentional declassification of information assets, between systems protected by the methodology herein, without the need for the underlying systems to participate. For example, the techniques herein, with general reference to FIG. 8, may prevent retrieving information assets from a secure storage system 810, and publishing/storing it to an unsecure (less secure) information system 820 (e.g., from a highly classified information system to a confidential information system). In other words, the techniques herein may prevent insertion of classified data, based on the embedded steganographic code, into an unauthorized system, where the unauthorized system would be either unable to remove/detect the code (e.g., different levels of detection/decoding), or where the unauthorized system would be able to detect the steganographic code and determine that it should not store/publish the content (e.g., to prevent accidental release of confidential information).

Figure 9:
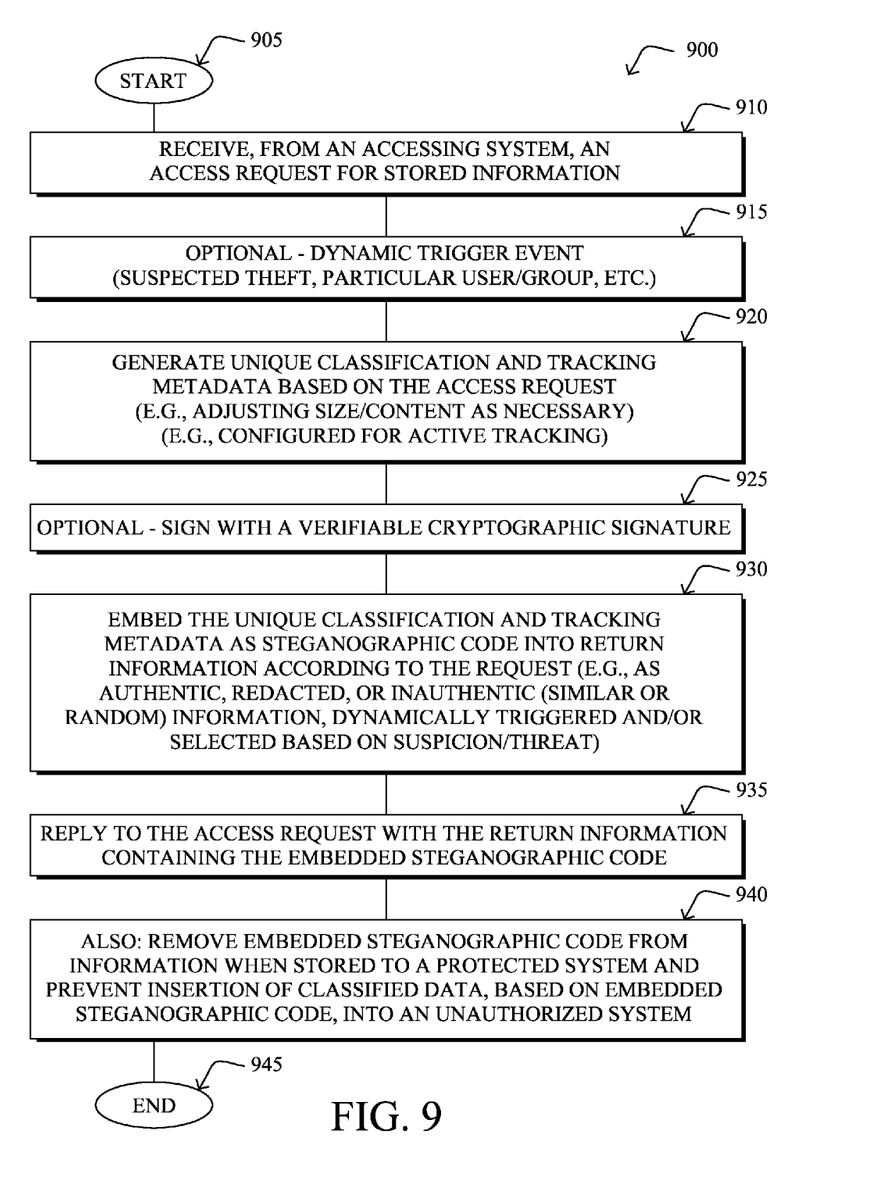
FIG. 9 illustrates an example simplified procedure for tracking and tracing information theft from computer systems.

FIG. 9 illustrates an example simplified procedure for tracking and tracing information theft from computer systems in accordance with one or more embodiments described herein. The procedure 900 may start at step 905, and continues to step 910, where, as described in greater detail above, a device (e.g., the storage system 110 directly or else an intermediate appliance 120) receives, from an accessing system 130, an access request for stored information 105. Whether as a continuous operation, or else optionally in response to a dynamic trigger event in step 915, such as a suspected theft, particular user/group, etc., the receiving device generates unique classification and tracking metadata based on the access request in step 920. Note that as mentioned above, the device may adjust the size/content of the metadata as necessary. Also note that the generated code may be passive or active (i.e., configured for active tracking) as described above.

Once optionally signing the classification and tracking metadata with a verifiable cryptographic signature 520 (e.g., based on the classification and tracking metadata itself or additionally based on the source information, as described above) in step 925, in step 930, the device may then embed the classification and tracking metadata (e.g., and signature) as steganographic code 420 into return information according to the request. Note that as mentioned above, the return information may be authentic information (i.e., what was requested), a redacted version of the authentic information, or inauthentic (similar or random) information, as detailed above. Note, also, that the use of anything other than authentic information may be dynamically triggered and the particular type of "non-authentic" information may be selected based on suspicion/threat/etc. The device may then reply to the access request with the return information containing the embedded steganographic code in step 935, accordingly. Note that on the return end, in step 940 a device (storage system or intermediate device) may remove embedded steganographic code from information when stored to a protected system, and may also prevent insertion of classified data, based on embedded steganographic code, into an unauthorized system, according to the techniques as described above.

The procedure 900 may illustratively end in step 945. It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for tracking and tracing information theft from computer systems. In particular, by employing the described methodology, it is possible to reduce and mitigate damages from information theft, particularly intellectual property theft, beyond what is possible today. Also, existing product offerings for digital watermarking are not capable of providing on-demand and dynamic tracking information for information systems, and instead only provide static tracking information (i.e., the same for everyone) to specific media types, such as images, or audio. Moreover, the techniques herein provide a system for tracking information assets that does not require computing systems involved in handling the content to actively participate, such as with trust-based schemes like digital rights management. Also, the techniques herein may be provided by a service-based appliance that applies these methods to protected content, illustratively on-demand or through automated reaction to detectable events that indicate a threat.

While there have been shown and described illustrative embodiments that provide for tracking and tracing information theft from computer systems, it is to be understood that various other adaptations and modifications may be made within the spirit and scope of the embodiments herein. For example, the embodiments have been shown and described herein with relation to particular types of information, particular programs, etc. However, the embodiments in their broader sense are not as limited, and may, in fact, be used with other types of information and programs. In addition, though generally described herein with relation to "soft" information, such as computer code, computer files, etc., the techniques herein may be applied to mechanical and electrical hardware design, such as through embedding classification and tracking metadata into CAD schematics to produce steganographic information within the physical properties of circuit boards, ASICs, and machined or 3-D-printed parts. In other words, the tracking information in this case extends into the real world, allowing traceability of stolen information (e.g., intellectual property) that has resulted in unauthorized reproductions of physical goods.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, from an accessing system in a computer network, an access request for stored information;
generating, by a device in the computer network, unique classification and tracking metadata based on the access request, wherein the unique classification and tracking metadata includes traceable and verifiable information that uniquely identifies one or more features of the access request, the one or more features including at least an accessing user, an access time and an information system by which a user accessed the stored information;
embedding, by the device, the classification and tracking metadata as steganographic code into return information according to the request; and
replying to the access request, by the device, with the return information containing the embedded steganographic code.

2. The method as in claim 1, further comprising:
signing the unique classification and tracking metadata embedded as steganographic code with a verifiable cryptographic signature.

3. The method as in claim 2, further comprising:
extending the signature to include the return information.

4. The method as in claim 1, further comprising:
dynamically triggering use of the steganographic code in response to one of either a suspected information theft or a particular user access.

5. The method as in claim 4, further comprising:
determining the suspected information theft one of either manually or in response to automated event detection.

6. The method as in claim 1, further comprising:
configuring the embedded steganographic code to enable active tracking of the return information.

7. The method as in claim 6, wherein active tracking is enabled through a code selected from a group consisting of: executable computer instructions; obfuscated source code; macros; and
scripts.

8. The method as in claim 1, wherein the return information is selected from a group consisting of: authentic stored information; redacted authentic stored information; inauthentic similar information; and inauthentic random information.

9. The method as in claim 8, further comprising:
selecting the return information from the group based on a level of threat to the stored information.

10. The method as in claim 8, further comprising:
dynamically triggering selecting the return information from the group in response to a suspected information theft.

11. The method as in claim 1, wherein the receiving, generating, embedding, and replying are all performed by one of either a storing device or an intermediate device between the accessing system and the storing device.

12. The method as in claim 1, wherein the one or more features of the access request further include an access date; an accessing system location, or a combination thereof.

13. The method as in claim 12, further comprising:
selecting a particular subset of features of the access request from which the unique classification and tracking metadata is generated based on an available size of the unique classification and tracking metadata while remaining below a threshold of detection.

14. The method as in claim 1, wherein the requested stored information is selected from a group consisting of: multimedia files; binary executables; documents; videos; text; images; audio files; software source code; firmware source code; and electrical and mechanical design files.

15. The method as in claim 1, further comprising:
adjusting a size of the unique classification and tracking metadata based on the return information.

16. The method as in claim 1, further comprising:
removing embedded steganographic code from information when stored to a protected system.

17. The method as in claim 1, further comprising:
preventing insertion of classified data, based on embedded steganographic code, into an unauthorized system.

18. An apparatus, comprising:
one or more network interfaces to communicate with computer network;
a processor coupled to the network interfaces and configured to execute one or more processes; and
a memory configured to store a process executable by the processor, the process when executed operable to:
receive, from an accessing system, an access request for stored information;
generate unique classification and tracking metadata based on the access request, wherein the unique classification and tracking metadata includes traceable and verifiable information that uniquely identifies one or more features of the access request, the one or more features including at least an accessing user, an access time and an information system by which a user accessed the stored information;
embed the unique classification and tracking metadata as steganographic code into return information according to the request; and
reply to the access request with the return information containing the embedded steganographic code.

19. The apparatus as in claim 18, wherein the process when executed is further operable to:
sign the unique classification and tracking metadata embedded as steganographic code with a verifiable cryptographic signature.

20. The apparatus as in claim 18, wherein the process when executed is further operable to:
dynamically trigger use of the steganographic code in response to one of either a suspected information theft or a particular user access.

21. The apparatus as in claim 18, wherein the process when executed is further operable to:
configure the embedded steganographic code to enable active tracking of the return information.

22. The apparatus as in claim 18, wherein the return information is selected from a group consisting of: authentic stored information; redacted authentic stored information; inauthentic similar information; and inauthentic random information.

23. The apparatus as in claim 18, wherein the apparatus is one of either a storing device or an intermediate device between the accessing system and the storing device.

24. A non-transitory computer-readable medium having software encoded thereon, the software when executed by a processor operable to:
  receive, from an accessing system, an access request for stored information;
  generate unique classification and tracking metadata based on the access request, wherein the unique classification and tracking metadata includes traceable and verifiable information that uniquely identifies one or more features of the access request, the one or more features including at least an accessing user, an access time and an information system by which a user accessed the stored information;
  embed the unique classification and tracking metadata as steganographic code into return information according to the request; and
  reply to the access request with the return information containing the embedded steganographic code.

* * * * *